(12) United States Patent
Horii et al.

(10) Patent No.: US 11,436,717 B2
(45) Date of Patent: Sep. 6, 2022

(54) IMAGE PROCESSING DEVICE AND IMAGE PROCESSING METHOD

(71) Applicant: Panasonic Intellectual Property Management Co., Ltd., Osaka (JP)

(72) Inventors: Toshihide Horii, Osaka (JP); Shohei Kamada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 82 days.

(21) Appl. No.: 16/979,545

(22) PCT Filed: Mar. 27, 2019

(86) PCT No.: PCT/JP2019/013194
§ 371 (c)(1),
(2) Date: Sep. 10, 2020

(87) PCT Pub. No.: WO2019/194044
PCT Pub. Date: Oct. 10, 2019

(65) Prior Publication Data
US 2020/0410657 A1   Dec. 31, 2020

(30) Foreign Application Priority Data

Apr. 4, 2018 (JP) .............................. JP2018-072512

(51) Int. Cl.
*G06K 9/00* (2022.01)
*G06T 7/00* (2017.01)
*G06N 3/08* (2006.01)

(52) U.S. Cl.
CPC .............. *G06T 7/001* (2013.01); *G06N 3/08* (2013.01); *G06T 2207/20081* (2013.01); *G06T 2207/20084* (2013.01); *G06T 2207/20212* (2013.01)

(58) Field of Classification Search
CPC .......... G06T 7/001; G06T 2207/20081; G06T 2207/20084; G06T 2207/20212; G06T 2207/30144; G06N 3/08; G06N 3/0454
See application file for complete search history.

(56) References Cited

U.S. PATENT DOCUMENTS 7,333,650 B2    2/2008  Yamamoto
9,741,107 B2 *  8/2017  Xu .......................... G06V 10/40
(Continued)

FOREIGN PATENT DOCUMENTS

JP    2004-191112 A    7/2004
JP    2004-354250 A   12/2004
(Continued)

OTHER PUBLICATIONS

International Search Report for corresponding Application No. PCT/JP2019/013194, dated Jul. 2, 2019.
(Continued)

*Primary Examiner* — Samir A Ahmed
(74) *Attorney, Agent, or Firm* — Renner, Otto, Boisselle & Sklar, LLP

(57) ABSTRACT

A first input unit receives an inspection image subject to inspection. A second input unit receives a normal reference image that should be referred to. A processing unit subjects the inspection image input to the first input unit and the reference image input to the second input unit to a process in a neural network. An output unit outputs information that results from the process in the processing unit and relates to an item of defect included in the inspection image.

15 Claims, 7 Drawing Sheets

(56) References Cited

U.S. PATENT DOCUMENTS

| | | |
|---|---|---|
| 2005/0002560 A1 | 1/2005 | Yamamoto |
| 2016/0358321 A1 | 12/2016 | Xu et al. |
| 2017/0059491 A1* | 3/2017 | Duffy .................... G06V 10/75 |
| 2019/0238568 A1* | 8/2019 | Goswami ............... G06F 21/566 |
| 2020/0072933 A1* | 3/2020 | Ye ....................... G01R 33/5608 |
| 2020/0075154 A1* | 3/2020 | Akahori ................. G16H 30/20 |
| 2020/0219268 A1* | 7/2020 | Liu ......................... G06T 7/246 |
| 2020/0342572 A1* | 10/2020 | Chen ........................ G06N 3/04 |

FOREIGN PATENT DOCUMENTS

| | | |
|---|---|---|
| JP | 2012-26982 A | 2/2012 |
| JP | 2017-107541 A | 6/2017 |

OTHER PUBLICATIONS

Extended European Search Report for Corresponding Application No. 19782200.0 dated May 3, 2021.

Junhui Wu et al., Spot the Difference by Object Detection, arxiv.org, Cornell University Library, 201 Olin Library Cornell University, Ithaca NY 14853, XP081212445, Jan. 3, 2018.

* cited by examiner

100

100

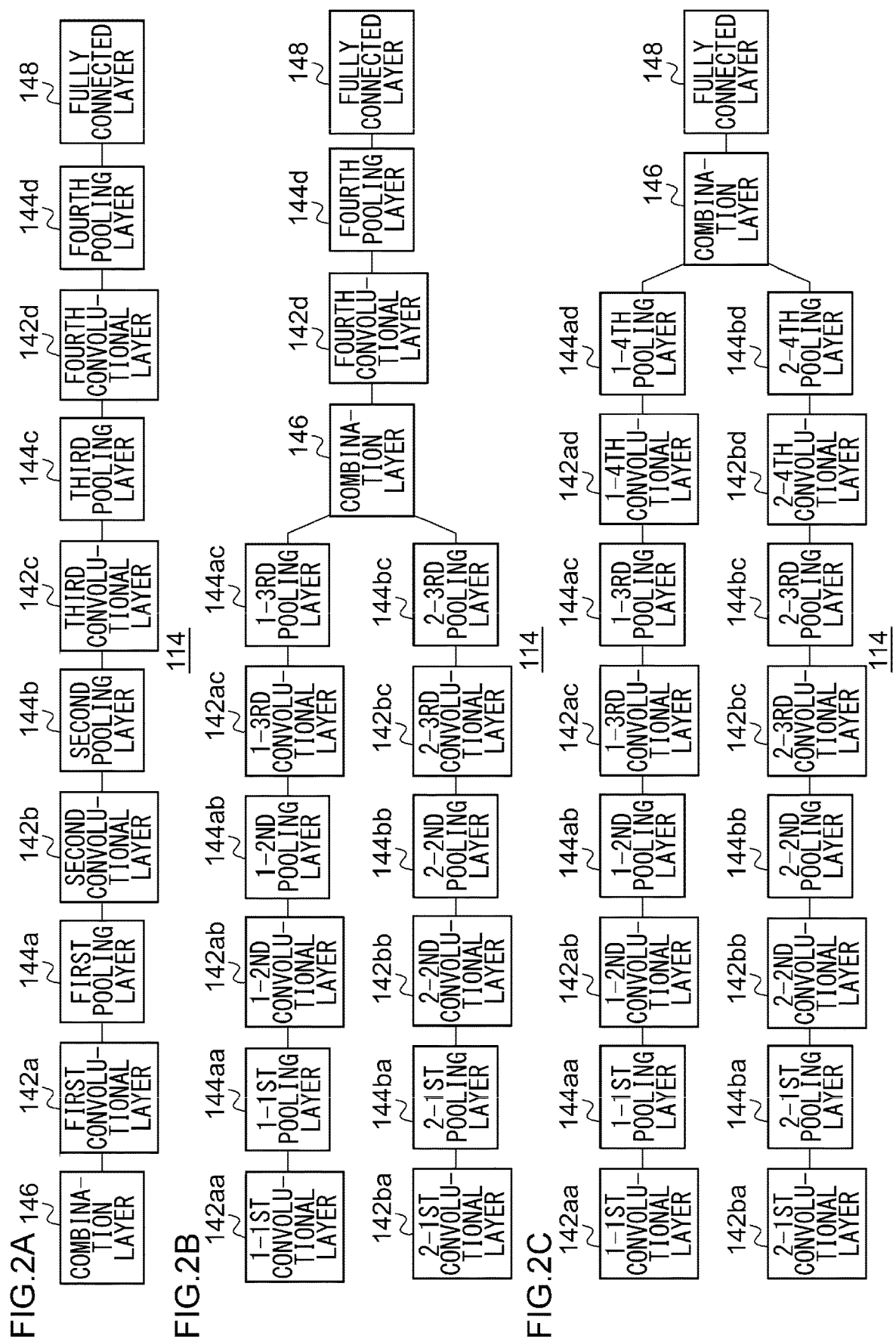

FIG.3

| OK |
|---|
| VOIDS |
| INSUFFICIENT BOLDNESS |

114

IMAGE PROCESSING DEVICE AND IMAGE PROCESSING METHOD

TECHNICAL FIELD

The present disclosure relates to a processing technology and, more particularly, to a processing method for subjecting an image to a process and a processing device using the processing method.

BACKGROUND ART

A characteristic region in an image is detected in an appearance inspection step for a product. Detection is made by identifying a change in the image by referring to a difference between a normal reference image and an image subject to inspection. However, such a method cannot detect an abnormality properly if there is an error in the positioning of an inspected object and when the shape of the inspected object changes slightly. This is addressed by defining a region of interest and a peripheral region surrounding the region of interest in the subject image and calculating, for each region, an outlier numerically indicating the uniqueness of the region of interest in the image by using the feature amount related to color and uniqueness in the image (see, for example, patent literature 1).
[Patent Literature 1] JP2017-107541

SUMMARY OF INVENTION

Technical Problem

It is effective to use a neural network in order to detect an abnormality in an image subject to inspection with reference to a reference image in a manner that makes positioning of the image subject to inspection and the reference image unnecessary. If the reference image is changed due to a change in the specification of the product or the like, however, it is necessary to learn a new reference image. Meanwhile, insufficient learning reduces the accuracy of the process.

The present disclosure addresses the above-described issue, and an illustrative purpose thereof is to provide a technology for inhibiting reduction in the accuracy of the process, while inhibiting an increase in the volume of work required for learning at the same time.

Solution to Problem

A processing device according to an embodiment of the present disclosure includes: a first input unit that receives an inspection image subject to inspection; a second input unit that receives a reference image that should be referred to; a processing unit that subjects the inspection image input to the first input unit and the reference image input to the second input unit to a process in a neural network; and an output unit that outputs information that results from the process in the processing unit and relates to an item of defect included in the inspection image.

Another embodiment of the present disclosure relates to a processing method. The method includes: receiving an inspection image subject to inspection; receiving a reference image that should be referred to; subjecting the inspection image input and the reference image input to a process in a neural network; and outputting information that results from the process and relating to an item of defect included in the inspection image.

Optional combinations of the aforementioned constituting elements, and implementations of the present disclosure in the form of methods, devices, systems, computer programs, recording mediums recording computer programs, etc. may also be practiced as additional modes of the present disclosure.

Advantageous Effects of Invention

According to the present disclosure, it is possible to inhibit reduction in the accuracy of the process, while inhibiting an increase in the volume of work required for learning at the same time.

BRIEF DESCRIPTION OF DRAWINGS

FIGS. 2A-2C show a configuration of the processing unit of FIGS. 1A-1B;

FIG. 3 shows a data structure of training data input to the training data input unit of FIG. 1A;

DESCRIPTION OF EMBODIMENTS

A summary will be given before describing the embodiment of the present disclosure in specific details. The embodiment relates to a processing device for determining whether an item of defect is included in an image subject to inspection. Physical labeling of products is being replaced by laser printing with an aim to reducing the cost for manufacturing labels and eliminating the step of attaching a label. In the case of laser printing, voids in laser printing are automatically inspected by image processing. In the related art, voids (missing print) are detected by referring to a difference between an image of laser printing subject to inspection (hereinafter, "inspection image") and an image that should be referred to (hereinafter, "reference image"). Specifically, the position of the inspection image is corrected before calculating a difference from the reference image, and it is determined whether the inspection image and the reference image match. In the case of a match, the inspection image shows that laser printing is performed accurately. In the case of a mismatch, voids in laser printing are found in the reference image.

A method like this requires setting threshold values for character boldness for each product, allowing for different character boldness depending on the product. It also requires severe positioning for setting a region defined by three points in each product. These requirements vary depending on the product or vary every time the product is renewed. It is therefore necessary to adjust an inspection program for each product or for each renewal of the product. It is effective to use a neural network to eliminate the need for setting threshold values or severe positioning. In a neural network, however, it is necessary to learn a reference images, by using an image including an item of defect and an image of a non-defective product. If a pattern in the reference image is changed, relearning is necessary.

Relearning requires an increase in the volume of learning. However, insufficient learning reduces the accuracy of the process.

The processing device according to the embodiment receives an inspection image and a reference image and learns information on items of defect included in the inspection image as training data. After learning the training data, the processing device receives the inspection image and the reference image and identifies items of defect included in the inspection image. In other words, the processing device does not learn the reference image itself but learn items of defect resulting from a comparison between the inspection image and the reference image. Thus, when the reference image is changed due to a product renewal, it is only required to input a new reference image and an inspection image to the processing device, making it possible to examine a printing pattern not learned yet.

Figure 1A:
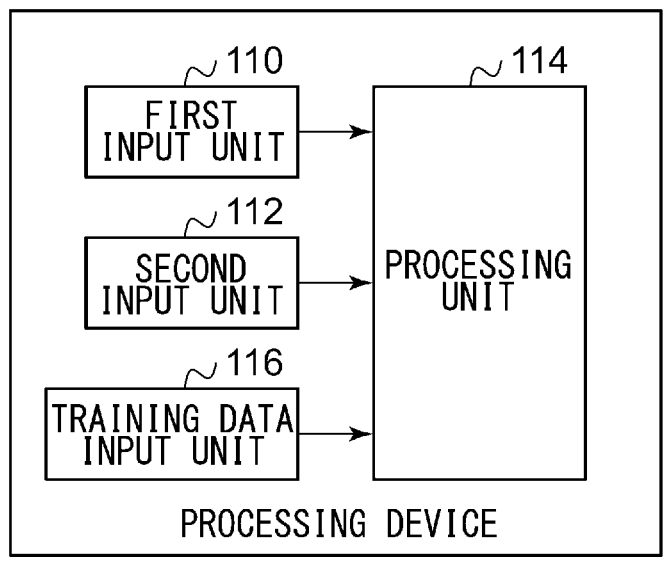
FIG. 1A-1B show a configuration of the processing device according to the embodiment.
Figure 1B:
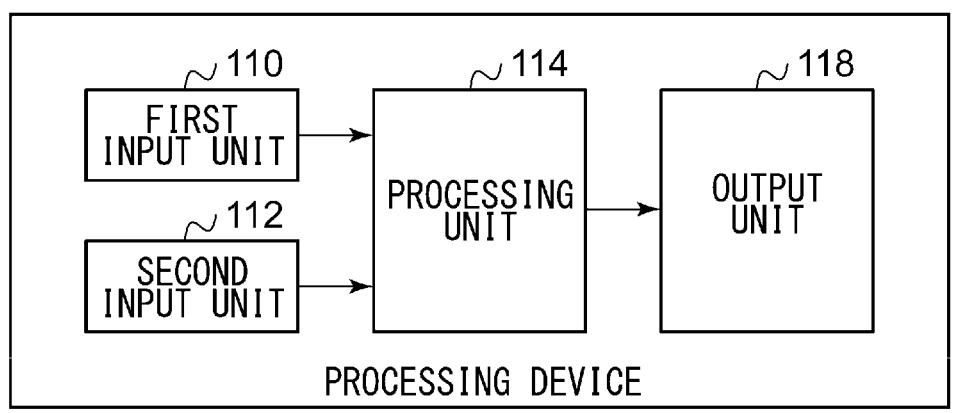

FIG. 1A-1B show a configuration of the processing device 100. In particular, FIG. 1A shows a configuration for the learning process, and FIG. 1B shows a configuration for the determination process. The determination process is a process for identifying an item of defect included in the inspection image by using a neural network in the inspection image and the reference image. Examples of items of defect include voids and insufficient boldness. The processing device 100 in FIG. 1A and the processing device 100 in FIG. 1B may be configured as the same device or different devices.

The processing device 100 includes a first input unit 110, a second input unit 112, a processing unit 114, a training data input unit 116 as features for the learning process and includes a first input unit 110, a second input unit 112, a processing unit 114, and an output unit 118 as features for the determination process. The processing unit 114 is used in the learning process, and the processing unit 114 is used in the determination process. The configuration of the processing unit 114 will be described before describing the configuration of the processing device 100.

FIGS. 2A-2C show a configuration of the processing unit 114. FIG. 2A shows an exemplary configuration of the processing unit 114. The processing unit 114 includes a first convolutional layer 142a, a second convolutional layer 142b, a third convolutional layer 142c, a fourth convolutional layer 142d, which are generically referred to as convolutional layers 142, a first pooling layer 144a, a second pooling layer 144b, a third pooling layer 144c, a fourth pooling layer 144d, which are generically referred to as pooling layers 144, a combination layer 146, and a fully connected layer 148.

The combination layer 146 is connected to the first input unit 110 and the second input unit 112 of FIGS. 1A-1B. The combination layer 146 receives an inspection image from the first input unit 110 and receives a reference image from the second input unit 112. The combination layer 146 combines the inspection image and the reference image. In the first example of combination, the inspection image and the reference image, which are the two inputs, are merged into one image as different channels. In this case, a combination of the inspection image and the reference image is generated. In the second example of combination, a difference between corresponding pixels in the inspection image and the reference image, which are the two inputs, is calculated, and an image (hereinafter, "differential image") in which differences are arranged for the respective pixels is generated. In the third example of combination, the inspection image, the reference image, and the differential image are merged into one image as separate channels. In this case, a combination of the inspection image, the reference image, and the differential image is generated. In the fourth example of combination, the reference image and the differential image are merged into one image as separate channels. In this case, a combination of the reference image and the differential image is generated. In the fifth example of combination, the inspection image and the differential image are merged into one image as separate channels. In this case, a combination of the inspection image and the differential image is generated. The combination layer 146 outputs a result of combination (hereinafter, "combined image"). The inspection image, the reference image, and the differential image are generically referred to as "images."

The convolutional layer 142 subjects each channel in the combined image to spatial filtering, successively shifting a spatial filter of a size smaller than the size of the image. Spatial filtering is a publicly known technology, and a description thereof is omitted. Spatial filtering is equivalent to a convolutional process. The convolutional process extracts a feature amount of the image. Padding, etc. may be performed in the convolutional layer 142. The convolutional layer 142 may also use a plurality of spatial filters in parallel and perform a plurality of spatial filtering steps in parallel in the image in each channel. Using a plurality of spatial filters in parallel increases the image. This is equivalent to increasing the number of channels in the combined image.

The pooling layer 144 reduces the size of the image by aggregating a plurality of pixels included in an arbitrary region in the image in each channel in the combined image into a single pixel. For aggregation of a plurality of pixels into a single pixel, average pooling or maximum pooling is performed. In average pooling, an average value of a plurality of pixel values in the region is used for the single pixel. In maximum pooling, the maximum value of a plurality of pixel values in the region is used for the single pixel. A pooling process is performed to reinforce the robustness for translation of a representative value or an average value in the region of interest.

In this case, the processes are performed in the order of the first convolutional layer 142a, the first pooling layer 144a, the second convolutional layer 142b, the second pooling layer 144b, the third convolutional layer 142c, the third pooling layer 144c, the fourth convolutional layer 142d, and the fourth pooling layer 144d. In other words, a convolutional process and a pooling process are repeated for the combined image. By repeating a convolutional process and a pooling process, the size of the image in each channel is progressively reduced. As a result, a combined image having a 1×1 spatial dimension and having one or more channels is output to the fully connected layer 148.

The fully connected layer 148 receives an image from which a feature amount is extracted. The fully connected layer 148 identifies the image by performing grouping into a plurality of classes based on the feature amount. A publicly known technology may be used in the process in the fully connected layer 148, and a description thereof is omitted. A result of grouping in the fully connected layer 148 shows a probability for each of three classes including "OK", "void", and "insufficient boldness". "OK" represents a case where the inspection image does not include an item of defect with reference to the reference image, "void" represents a case where the inspection image includes a void print portion with reference to the reference image, and "insufficient boldness" represents a case where the inspection image includes a printed portion of insufficient boldness with reference to the reference image. In particular, "void" and "insufficient boldness" can be said to be items of defect.

"Extra boldness", "collapse", and "foreign materials" may be grouping items of defect in addition to "void" and "insufficient boldness".

Based on the configuration of the processing unit 114 as described above, a description will now be given of the learning process in the processing device 100 with reference to FIG. 1A. As mentioned above, the first input unit 110 receives an image for learning instead of an inspection image, and the second input unit 112 receives a reference image. Unlike the case of an inspection image for which it is not known what items of defect are included, items of defect included in the image for learning are known. The training data input unit 116 receives training data corresponding to the relationship between the image for leaning and the reference image, i.e., receives training data showing items of defect included in the image for learning. The processing unit 114 is configured as described in FIG. 2A. The processing unit 114 trains a coefficient of a spatial filter of each convolutional layer 142 so that the relationship between the image for learning received by the first input unit 110 and the reference image received by the second input unit 112 is represented by the training data received by the training data input unit 116.

Figure 3:
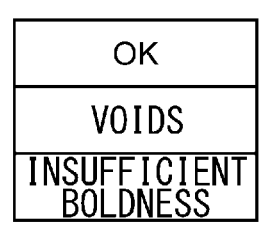

The reference image shows an ideally laser-printed pattern, and the image for learning shows an actually laser-printed pattern. The training data shows the relationship between the reference image and the image for learning. FIG. 3 shows a data structure of training data input to the training data input unit 116. The training data has three channels, which, like the result of grouping in the fully connected layer 148, include OK, voids, and insufficient boldness. When the image for learning does not include any items of defect with reference to the reference image, the training data shows OK. When the image for learning includes an item(s) of defect with reference to the reference image, on the other hand, the training data shows voids or insufficient boldness depending on the cause. A publicly known technology may be used to train a coefficient of a spatial filter, and a description thereof is omitted.

A description will now be given of the determination process in the processing device 100 with reference to FIG. 1B. In the case the processing devices 100 in FIGS. 1A and 1n FIG. 1B are configured as different devices, the coefficient of the spatial filter derived by learning in the processing unit 114 in FIG. 1A is set in the processing unit 114 in FIG. 1B.

The first input unit 110 receives an inspection image, and the second input unit 112 receives the reference image. The processing unit 114 has a configuration shown in FIG. 2A and subjects the inspection image input to the first input unit 110 and the reference image input to the second input unit 112 to a process in a neural network. The output unit 118 outputs information that results from the process in the processing unit 114 and relating to an item(s) of defect included in the inspection image with reference to the reference image. In other words, information indicating one of OK, voids, and insufficient boldness is output.

A further exemplary configuration of the processing unit 114 will be shown below. FIG. 2B shows a further exemplary configuration of the processing unit. The processing unit 114 includes a 1-1st convolutional layer 142aa, a 1-2nd convolutional layer 142ab, a 1-3rd convolutional layer 142ac, a 2-1st convolutional layer 142ba, a 2-2nd convolutional layer 142bb, a 2-3rd convolutional layer 142bc, and a fourth convolutional layer 142d, which are generically referred to as convolutional layers 142, a 1-1st pooling layer 144aa, a 1-2nd pooling layer 144ab, a 1-3rd pooling layer 144ac, a 2-1st pooling layer 144ba, a 2-2nd pooling layer 144bb, a 2-3rd pooling layer 144bc, and a fourth pooling layer 144d, which are generically referred to as pooling layers 144, a combination layer 146, and a fully connected layer 148.

The 1-1st convolutional layer 142aa, the 1-1st pooling layer 144aa, the 1-2nd convolutional layer 142ab, the 1-2nd pooling layer 144ab, the 1-3rd convolutional layer 142ac, and the 1-3rd pooling layer 144ac are arranged in the stated order. These layers subject the inspection image input to the first input unit 110 to the aforementioned process. The 2-1st convolutional layer 142ba, the 2-1st pooling layer 144ba, the 2-2nd convolutional layer 142bb, the 2-2nd pooling layer 144bb, the 2-3rd convolutional layer 142bc, and the 2-3rd pooling layer 144bc are arranged in the stated order. These layers subject the reference image input to the second input unit 112 to the aforementioned process.

The combination layer 146 receives a processing result from the 1-3rd pooling layer 144ac and a processing result from the 2-3rd pooling layer 144bc. The processing result from the 1-3rd pooling layer 144ac is a result of processing the inspection image (hereinafter, "first processing result), and the processing result from the 2-3rd pooling layer 144bc is a result of processing the reference image (hereinafter, "second processing result"). Each of the first processing result and the second processing result may be comprised of a plurality of channels. The combination layer 146 combines the first processing result and the second processing result. Combination may be built according to any of the first through fifth examples described above. A differential image is generated between corresponding channels in the first processing result and the second processing result. The combination layer 146 outputs a result of combination (hereinafter, also referred to as "combined image").

The fourth convolutional layer 142d and the fourth pooling layer 144d subject the combined image to a convolutional process and a pooling process successively. The fully connected layer 148 is configured as described in FIG. 2A. The learning process and the determination process in the processing device 100 including the processing unit 114 configured as described above are as already described, and a description thereof is omitted. Learning may result in the weight coefficient used to subject the inspection image to the process in the convolutional layer 142 being commonly used as the weight coefficient to subject the reference image to the process in the convolutional layer 142. Specifically, the weight coefficient is commonly used in the 1-1st convolutional layer 142aa and in the 2-1st convolutional layer 142ba. Further, the weight coefficient is commonly used in the 1-2nd convolutional layer 142ab and in the 2-2nd convolutional layer 142bb, and the weight coefficient is commonly used in the 1-3rd convolutional layer 142ac and in the 2-3rd convolutional layer 142bc.

FIG. 2C shows a still further exemplary configuration of the processing unit 114. The processing unit 114 includes a 1-1st convolutional layer 142aa, a 1-2nd convolutional layer 142ab, a 1-3rd convolutional layer 142ac, a 1-4th convolutional layer 142ad, a 2-1st convolutional layer 142ba, a 2-2nd convolutional layer 142bb, a 2-3rd convolutional layer 142bc, and a 2-4th convolutional layer 142bd, which are generically referred to as convolutional layers 142, a 1-1st pooling layer 144aa, a 1-2nd pooling layer 144ab, a 1-3rd pooling layer 144ac, a 1-4th pooling layer 144ad, a 2-1st pooling layer 144ba, a 2-2nd pooling layer 144bb, a 2-3rd pooling layer 144bc, and a 2-4th pooling layer 144bd, which are generically referred to as pooling layers 144, a combination layer 146, and a fully connected layer 148.

The 1-1st convolutional layer 142*aa*, the 1-1st pooling layer 144*aa*, the 1-2nd convolutional layer 142*ab*, the 1-2nd pooling layer 144*ab*, the 1-3rd convolutional layer 142*ac*, the 1-3rd pooling layer 144*ac*, the 1-4th convolutional layer 142*ad*, and the 1-4th pooling layer 144*ad* are arranged in the stated order. These layers subject the inspection image input to the first input unit 110 to the aforementioned process. The 2-1st convolutional layer 142*ba*, the 2-1st pooling layer 144*ba*, the 2-2nd convolutional layer 142*bb*, the 2-2nd pooling layer 144*bb*, the 2-3rd convolutional layer 142*bc*, the 2-3rd pooling layer 144*bc*, the 2-4th convolutional layer 142*bd*, and the 2-4th pooling layer 144*bd* are arranged in the stated order. These layers subject the reference image input to the second input unit 112 to the aforementioned process.

The combination layer 146 receives a processing result from the 1-4th pooling layer 144*ad* and a processing result from the 2-4th pooling layer 144*bd*. The processing result from the 1-4th pooling layer 144*ad* is a result of processing the inspection image (hereinafter, also referred to as "first processing result), and the processing result from the 2-4th pooling layer 144*bd* is a result of processing the reference image (hereinafter, also referred to as "second processing result"). The combination layer 146 combines the first processing result and the second processing result. Combination may be built according to any of the first through fifth patterns described above. The combination layer 146 outputs a result of combination (hereinafter, also referred to as "combined image").

The fully connected layer 148 is configured as described in FIG. 2A. The learning process and the determination process in the processing device 100 including the processing unit 114 configured as described above are as already described, and a description thereof is omitted. Learning may result in the weight coefficient used to subject the inspection image to the process in the convolutional layer 142 being commonly used as the weight coefficient to subject the reference image to the process in the convolutional layer 142. Specifically, the weight coefficient is commonly used in the 1-1st convolutional layer 142*aa* and in the 2-1st convolutional layer 142*ba*, and the weight coefficient is commonly used in the 1-2nd convolutional layer 142*ab* and in the 2-2nd convolutional layer 142*bb*. Further, the weight coefficient is commonly used in the 1-3rd convolutional layer 142*ac* and in the 2-3rd convolutional layer 142*bc*, and the weight coefficient is commonly used in the 1-4th convolutional layer 142*ad* and in the 2-4th convolutional layer 142*bd*.

Figure 4:
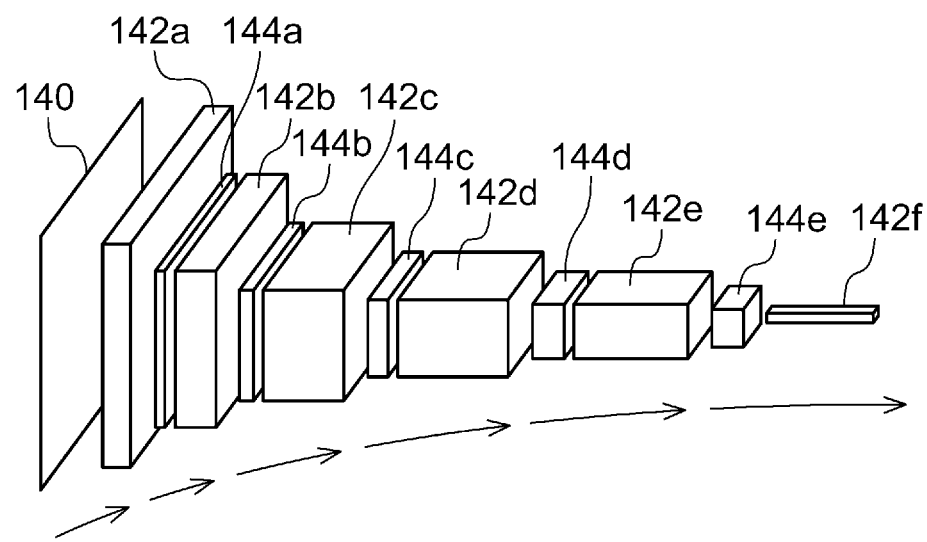
FIG. 4 shows an outline of a process in the processing unit of FIGS. 1A-1B.

The fully connected layer 148 may be excluded from the configuration of the processing unit 114. A description will be given of the configuration with reference to FIG. 4. FIG. 4 shows an outline of a process in the processing unit 114. For clarity of explanation, the processing unit 114 is shown as a one-input unit, and the combination layer 146 is omitted from the illustration. However, the processing unit 114 is a two-input unit as in the case of FIGS. 2A-2C, and the combination layer 146 may be included. The processing unit 114 includes a first convolutional layer 142*a*, a second convolutional layer 142*b*, a third convolutional layer 142*c*, a fourth convolutional layer 142*d*, a fifth convolutional layer 142*e*, a sixth convolutional layer 142*f*, which are generically referred to as convolutional layers 142, a first pooling layer 144*a*, a second pooling layer 144*b*, a third pooling layer 144*c*, a fourth pooling layer 144*d*, a fifth pooling layer 144*e*, which are generically referred to as pooling layers 144. The convolutional layers 142 and the pooling layers 144 are shown as blocks to give an image of the respective processes.

The input image 140 is an image subject to the determination process in the processing device 100. Like a fully convolutional neural network, the neural network in the processing unit 114 does not include a fully connected layer 148 so that a limit to the size of the input image 140 is not provided. The input image 140 is input to the first convolutional layer 142*a*. In this case, the first convolutional layer 142*a*, the first pooling layer 144*a*, the second convolutional layer 142*b*, the second pooling layer 144*b*, the third convolutional layer 142*c*, the third pooling layer 144*c*, the fourth convolutional layer 142*d*, the fourth pooling layer 144*d*, the fifth convolutional layer 142*e*, the fifth pooling layer 144*e*, and the sixth convolutional layer 142*f* are arranged in the stated order. In other words, a convolutional process and a pooling process are repeated as already described.

Based on the configuration of the processing unit 114 as described above, a description will now be given of the learning process in the processing device 100 with reference to FIG. 1A. As mentioned above, the first input unit 110 receives an image for learning, the second input unit 112 receives a reference image, and the training data input unit 116 receives training data. The processing unit 114 trains a coefficient of a spatial filter of each convolutional layer 142 so that the relationship between the image for learning received by the first input unit 110 and the reference image received by the second input unit 112 is represented by the training data received by the training data input unit 116.

In this embodiment, the size of the training data is configured to have a 1×1 spatial dimension. Therefore, the training data merely shows one of a limited number of classes to indicate the relationship between the image for learning and the reference image. In other words, the training data for one channel need only indicate whether one class is met. Thus, as compared with the case of producing an image subjected to segmentation by filling objects with colors, the volume of work to produce one item of training data is reduced. As a result, it is possible to increase the number of items of training data while also inhibiting an increase in the volume of work.

Meanwhile, the image for learning and the reference image are original images that output the training data when the determination process is performed accurately, and its size thereof is defined to result in training data having a 1×1 spatial dimension. Since a limit to the size of the input image 140 is not provided, the image used in the learning process and the image used in the determination process may have different sizes. A publicly known technology may be used to train a coefficient of a spatial filter, and a description thereof is omitted.

A description will now be given of a variation of the processing device 100.

(First Variation)

Figure 5:
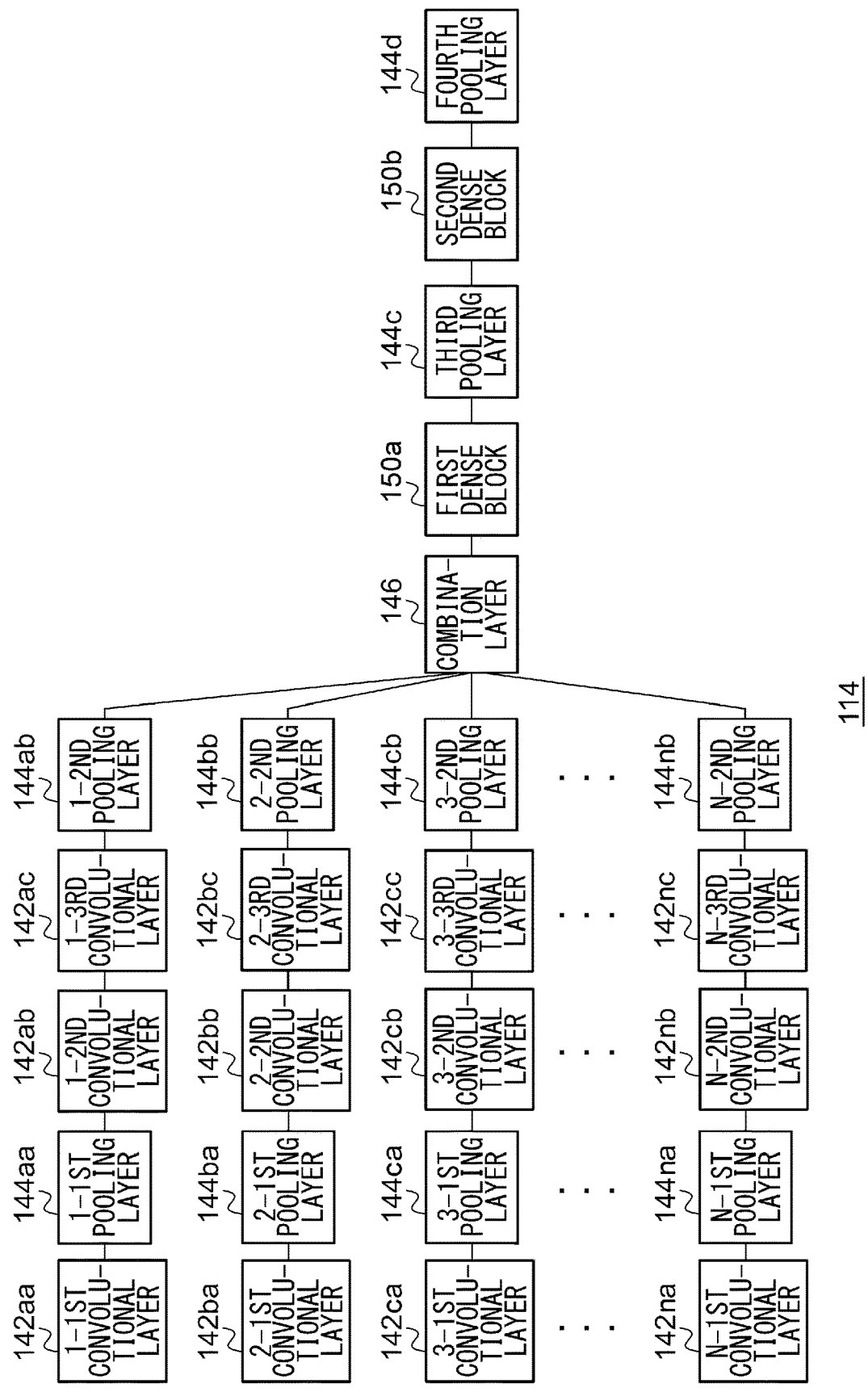
FIG. 5 shows a configuration of the processing unit according to a first variation.

The second input unit 112 of FIGS. 1A-1B receives, as the reference image, a plurality of types of reference image. The reference images are different from each other. The processing unit 114 subjects the reference image to a process in a neural network, by subjecting each of the plurality of types of reference image to a process in a neural network. FIG. 5 shows a configuration of the processing unit 114. The processing unit 114 includes a 1-1st convolutional layer 142*aa*, a 1-2nd convolutional layer 142*ab*, a 1-3rd convolutional layer 142*ac*, a 2-1st convolutional layer 142*ba*, a 2-2nd convolutional layer 142*bb*, a 2-3rd convolutional layer 142*bc*, a 3-1st convolutional layer 142*ca*, a 3-2nd convolutional layer 142*cb*, a 3-3rd convolutional layer 142*cc*, an N-1st convolutional layer 142*na*, an N-2nd convolutional layer 142*nb*, an N-3rd convolutional layer 142*nc*, which are generically referred to as convolutional layers 142, a 1-1st pooling layer 144*aa*, a 1-2nd pooling layer 144*ab*, a 2-1st pooling layer 144*ba*, a 2-2nd pooling layer 144*bb*, a 3-1st pooling layer 144*ca*, a 3-2nd pooling layer 144*cb*, an N-1st pooling layer 144*na*, an N-2nd pooling layer 144*nb*, a third pooling layer 144*c*, and a fourth pooling layer 144*d*, which are generically referred to as pooling layers 144, a combination layer 146, and a first dense block 150*a*, and a second dense block 150*b*, which are generically referred to as dense blocks 150.

The inspection image is input to the first input unit 110, the first reference image through the N-1st reference image, i.e., N-1 types reference images, are input to the second input unit 112. The 1-1st convolutional layer 142*aa* receives the inspection image from the first input unit 110, the 2-1st convolutional layer 142*ba* receives the first reference image from the second input unit 112, the 3-1st convolutional layer 142*ca* receives the second reference image from the second input unit 112, and the N-1st convolutional layer 142*na* receives the N-1st reference image from the second input unit 112. The 1-1st convolutional layer 142*aa*, the 1-1st pooling layer 144*aa*, the 1-2nd convolutional layer 142*ab*, the 1-3rd convolutional layer 142*ac*, and the 1-2nd pooling layer 144*ab* subject the inspection image to a process in a neural network as already described. The 2-1st convolutional layer 142*ba*, the 2-1st pooling layer 144*ba*, the 2-2nd convolutional layer 142*bb*, the 2-3rd convolutional layer 142*bc*, and the 2-2nd pooling layer 144*bb* subject the first reference image to a process in a neural network. The same is true of the other reference images.

The combination layer 146 receives processing results from the 1-2nd pooling layer 144*ab* through the N-2nd pooling layer 144*nb*. The combination layer 146 combines these processing results as described above. The combination layer 146 outputs a result of combination (hereinafter, also referred to as "combined image"). The first dense block 150*a* is comprised of a combination of the convolutional layer 142, the combination layer 146, etc. A publicly known technology may be used for the dense blocks 150, and a description thereof is omitted. The third pooling layer 144*c*, the second dense block 150*b*, and the fourth pooling layer 144*d* that follows the first dense block 150*a* perform the same process as described above, and a description thereof is omitted. The learning process in the convolutional layers 142 and the dense blocks 150 is adapted to the configuration of FIG. 5.

(Second Variation)

The inspection image input to the first input unit 110 and the reference image input to the second input unit 112 may be an image having an N dimension and M channels (N, M are integers). The N dimension encompasses one dimension, two dimension, three dimension, four dimension, .... The processing unit 114 may subject the inspection image and the reference image like this to the same process as described already.

(Third Variation)

Figure 6:
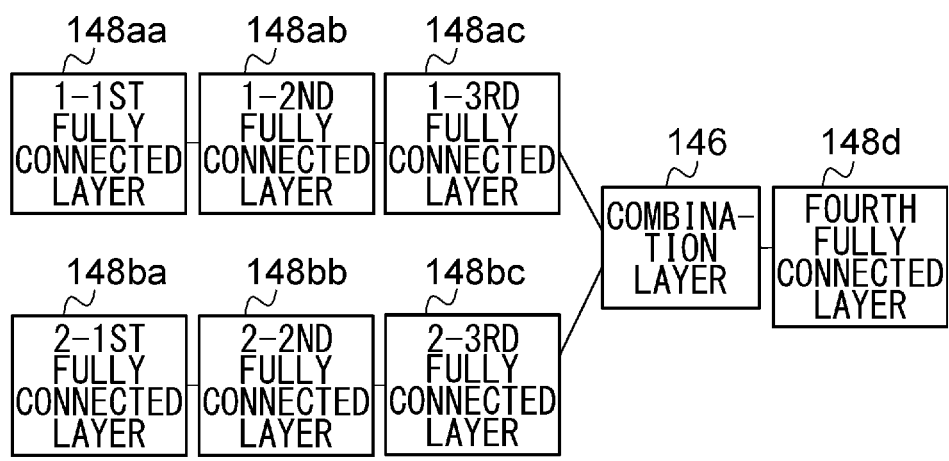
FIG. 6 shows a configuration of the processing unit according to a third variation.

The processing unit 114 described above includes the convolutional layers 142 and the pooling layers 144. Alternatively, the convolutional layers 142 and the pooling layers 144 may not be included. FIG. 6 shows a configuration of the processing unit 114. The processing unit 114 includes a combination layer 146, a 1-1st fully connected layer 148*aa*, a 1-2nd fully connected layer 148*ab*, a 1-3rd fully connected layer 148*ac*, a 2-1st fully connected layer 148*ba*, a 2-2nd fully connected layer 148*bb*, a 2-3rd fully connected layer 148*bc*, and fourth fully connected layer 148*d*, which are generically referred to as fully connected layers 148. In other words, the processing unit 114 only includes the fully connected layers 148, except for the combination layer 146. The 1-1st fully connected layer 148*aa* receives the inspection image from the first input unit 110, and the 2-1st fully connected layer 148*ba* receives the reference image from the second input unit 112. The 1-1st fully connected layer 148*aa* through the 1-3rd fully connected layer 148*ac* subject the inspection image to the process in the fully connected layer. The 2-1st fully connected layer 148*ba* through the 2-3rd fully connected layer 148*bc* subject the reference image to the process in the fully connected layer. The combination layer 146 receives processing results from the 1-3rd fully connected layer 148*ac* through the 2-3rd fully connected layer 148*bc*. The combination layer 146 combines these processing results as described above. The combination layer 146 outputs a result of combination (hereinafter, also referred to as "combined image"). The fourth fully connected layer 148*d* subjects the combined image to the process in the fully connected layer.

As in FIG. 2B, the combination layer 146 of FIG. 6 receives the result of processing the inspection image and the result of processing the reference image and outputs the combined image for processing. However, the combination layer 146 may, as in FIG. 2A, receive the inspection image and the reference image and output the combined image for processing. Alternatively, the combination layer 146 may, as in FIG. 2C, receive the result of processing the inspection image and the result of processing the reference image and output the combined image.

(Fourth Variation)

Figure 7A:
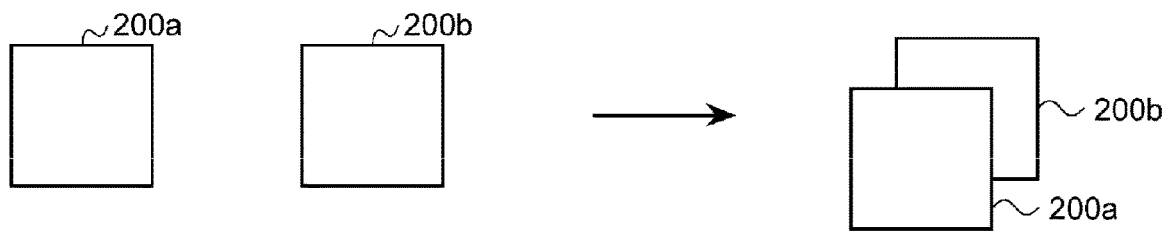
FIGS. 7A-7C show a configuration of the processing unit according to a fourth variation.
Figure 7B:
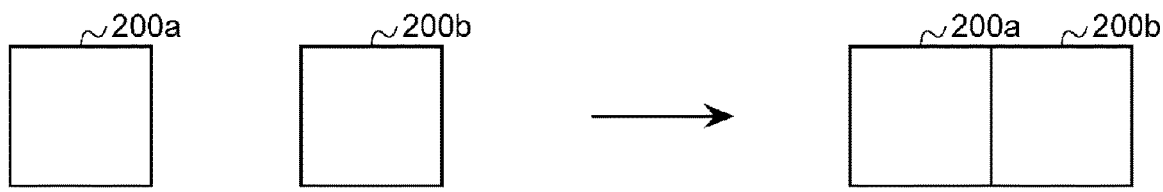
Figure 7C:
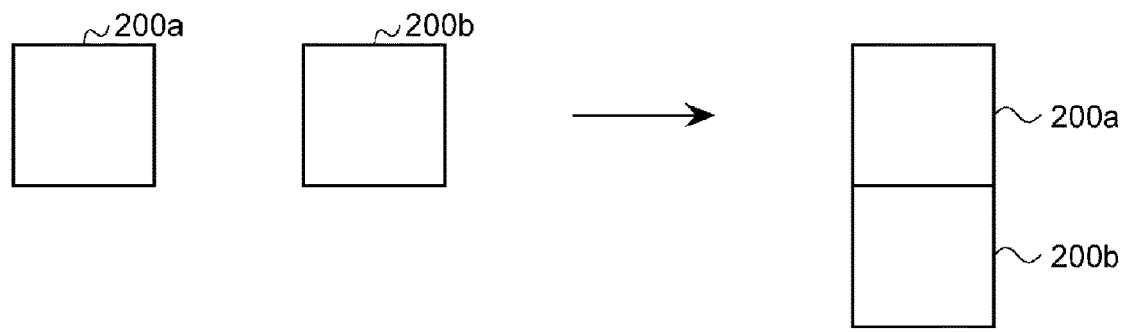

In the combination layer 146 described above, a plurality of channels are merged into one, as in the first example and in the third through fifth examples of combination. Modes of merging are not limited to those described. FIGS. 7A-7C show a configuration of the processing unit 114. A first input image 200*a* and a second input image 200*b* are two images input to the combination layer 146 and encompass the inspection image, the reference image, and the processing result. FIG. 7A illustrates a merge in the combination layer 146 already described. The first input image 200*a* and the second input image 200*b*, i.e., two channels, are merged into one channel. The number of input images 200, which generically refer to the first input image 200*a* and the second input image 200*b*, is not limited to "2". The resultant image having one channel corresponds to the combined image described above. In the case of FIG. 7B, the first input image 200*a* and the second input image 200*b*, i.e., two channels, are turned into one channel by arranging the images in the x-axis direction. In the case of FIG. 7C, the first input image 200*a* and the second input image 200*b*, i.e., two channels, are turned into one channel by arranging the images in the y-axis direction.

The device, the system, or the entity that executes the method according to the disclosure is provided with a computer. By causing the computer to run a program, the function of the device, the system, or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The plurality of electronic circuits may be integrated in one chip or provided in a plurality of chips. The plurality of chips may be aggregated in one device or provided in a plurality of devices. The program is recorded in a non-transitory recording medium such as a computer-readable ROM, optical disk, and hard disk drive. The program may be stored in a recording medium in advance or supplied to a recording medium via wide area communication network including the Internet.

According to the embodiment, an inspection image and a reference image are subject to a neural network process, thereby allowing information on an item of defect included in the inspection image to be output as a result of comparing the two images. Further, the result of comparing the two images is output. Therefore, even when the reference image is changed, the volume of learning required for learning a new reference image can be saved. Further, since the volume of learning required for learning a new reference image is saved even when the reference image is changed, the volume of work required for learning can be inhibited from increasing. Further, the neural network is caused to learn an item of defect included in the inspection image as training data. Therefore, the accuracy of the process can be inhibited from being reduced.

Further, the inspection image and the reference image are combined, and the combination is subject to the process in the convolutional layer 142 and the process in the pooling layer 144. Therefore, the processing volume can be inhibited from increasing. Further, each of the inspection image and the reference image is subject to the process in the convolutional layer 142 and the process in the pooling layer 144, and then the combination of the results is subject to the process in the convolutional layer 142 and the process in the pooling layer 144. Therefore, the precision of the process can be improved. Further, each of the inspection image and the reference image is subject to the process in the convolutional layer 142 and the process in the pooling layer 144, and then the results are combined. Therefore, the precision of the process can be improved.

Further, the weight coefficient used to subject the inspection image to the process in the convolutional layer 142 is commonly used as the weight coefficient to subject the reference image to the process in the convolutional layer 142. Therefore, the precision of the process can be improved. Further, two inputs are merged into one to produce a combination. Therefore, the process can be simplified. Further, a difference between two inputs is derived to produce a combination. Therefore, the process of the process can be simplified. Further, at least one of two inputs is merged with the difference to produce a combination. Therefore, the precision of the process can be improved. A convolutional neural network in which the spatial filter of the convolutional layer 142 is trained to learn training data having a 1 1 spatial dimension is used. Therefore, the volume of work required to create the training data can be reduced. Further, since the volume of work required to create the training data is reduced, it is possible to inhibit an increase in the volume of work required for learning. Further, since the volume of work required to create training data is reduced, the number of items of training data can be increased. Further, since the number of items of training data is increased, the precision of learning can be improved.

Further, a plurality of reference images are input. Therefore, the precision of the process can be improved. Further, the inspection image and the reference image are images having an N dimension and M channels (N, M are integers). Therefore, the scope of application of the embodiment can be expanded. Further, the inspection image and the reference image are combined, and then the combination is subject to the process in the fully connected layer 148. Therefore, the flexibility in configuration can be improved. Further, the inspection image is subject to the process in the fully connected layer 148, the reference image is subject to the process in the fully connected layer 148, and the combination of the result of processing the inspection image and the result of processing the reference image is subject to the process in the fully connected layer 148. Therefore, the flexibility in configuration can be improved. Further, the inspection image is subject to the process in the fully connected layer 148, the reference image is subject to the process in the fully connected layer 148, and the result of processing the inspection image and the result of processing the reference image are combined. Therefore, the flexibility in configuration can be improved.

A summary of an embodiment of the present disclosure is given below. A processing device (100) according to an embodiment of the present disclosure includes: a first input unit (110) that receives an inspection image subject to inspection; a second input unit (112) that receives a reference image that should be referred to; a processing unit (114) that subjects the inspection image input to the first input unit (110) and the reference image input to the second input unit (112) to a process in a neural network; and an output unit (118) that outputs information that results from the process in the processing unit (114) and relates to an item of defect included in the inspection image.

The second input (112) may receive, as a reference image, a first reference image and a second reference image that are different from each other, and the processing unit (114) may subject the reference image input to the second input unit to a process in a neural network by subjecting each of the first reference image and the second reference image to the process in a neural network.

The inspection image input to the first input unit (110) and the reference image input to the second input unit (112) may be images having an N dimension and M channels (N, M are integers).

The processing unit (114) may (1) combine the inspection image and the reference image and then (2) subject a combination to at least one of a process in a convolutional layer (142) and a process in a pooling layer (144).

The processing unit (114) may (1) subject the inspection image to at least one of a process in a convolutional layer (142) and a process in a pooling layer (144) and subject the reference image to at least one of a process in a convolutional layer (142) and a process in a pooling layer (144), (2) combine a result of processing the inspection image and a result of processing the reference image, and (3) subject a combination to at least one of a process in a convolutional layer (142) and a process in a pooling layer (144).

The processing unit (114) may (1) subject the inspection image to at least one of a process in a convolutional layer (142) and a process in a pooling layer (144) and subject the reference image to at least one of a process in a convolutional layer (142) and a process (144) in a pooling layer, and (2) combines a result of processing the inspection image and a result of processing the reference image.

A weight coefficient used by the processing unit (144) to subject the inspection image to the process in the convolutional layer (142) is commonly used by the processing unit (114) as a weight coefficient to subject the reference image to the process in the convolutional layer (142).

The neural network used in the processing unit (114) is a convolutional neural network in which a fully connected layer is excluded, and a filter of the convolutional layer in the convolutional neural network is trained to learn a processing result having a 1×1 spatial dimension.

The processing unit (114) may (1) combine the inspection image and the reference image and (2) subject a combination to a process in a fully connected layer (148).

The processing unit (114) may (1) subject the inspection process to a process in a fully connected layer (148) and subject the reference image to a process in a fully connected layer (148), (2) combine a result of processing the inspection image and a result of processing the reference image, and (3) subject a combination to a process in a fully connected layer (148).

The processing unit (114) may (1) subject the inspection process to a process in a fully connected layer (148) and subject the reference image to a process in a fully connected layer (148) and (2) combine a result of processing the inspection image and a result of processing the reference image.

The processing unit (114) may merge two inputs into one to produce the combination.

The processing unit (114) may perform a merge by arranging the two inputs in one direction.

The processing unit (114) may derive a difference between two inputs to produce the combination.

The processing unit (114) may merge the difference with at least one of the two inputs to produce the combination.

Another embodiment of the present disclosure relates to a processing method. The method includes: receiving an inspection image subject to inspection; receiving a reference image that should be referred to; subjecting the inspection image input and the reference image input to a process in a neural network; and outputting information that results from the process and relating to an item of defect included in the inspection image.

Described above is an explanation based on the embodiment. The embodiment is intended to be illustrative only and it will be understood by those skilled in the art that various modifications to constituting elements and processes could be developed and that such modifications are also within the scope of the present disclosure.

The processing unit 114 according to the embodiment is configured such that the plurality of convolutional layers 142 and the plurality of pooling layers 144 are alternately arranged. Alternatively, however, the processing unit 114 may have a configuration of a GoogleNet-based network, a DenseNet-based network, etc. According to this variation, the flexibility in the configuration can be improved.

The processing unit 114 according to the embodiment is configured such that the plurality of convolutional layers 142 and the plurality of pooling layers 144 are alternately arranged. Alternatively, however, the processing unit 114 may include only the convolutional layers 142 so that only the convolutional process is performed or include only the pooling layers 144 so that only the pooling process is performed. According to this variation, the flexibility in the configuration can be improved.

INDUSTRIAL APPLICABILITY

According to the present disclosure, it is possible to inhibit reduction in the accuracy of the process, while inhibiting an increase in the volume of work required for learning at the same time.

REFERENCE SIGNS LIST 100 processing device, 110 first input unit, 112 second input unit, 114 processing unit, 116 training data input unit, 118 output unit, 140 input image, 142 convolutional layer, 144 pooling layer, 146 combination layer, 148 fully connected layer

The invention claimed is:

1. A processing device comprising:
a first input unit that receives an inspection image subject to inspection;
a second input unit that receives a normal reference image that should be referred to;
a processing unit that subjects the inspection image input to the first input unit and the reference image input to the second input unit to a process in a neural network, wherein
the neural network used in the processing unit is a convolutional neural network in which a fully connected layer is excluded, and a filter of the convolutional layer in the convolutional neural network is trained to learn a processing result having a 1×1 spatial dimension; and
an output unit that outputs information that results from the process in the processing unit and relates to an item of defect included in the inspection image.

2. The processing device according to claim 1, wherein
the second input receives, as a reference image, a first reference image and a second reference image that are different from each other, and
the processing unit subjects the reference image input to the second input unit to a process in a neural network by subjecting each of the first reference image and the second reference image to the process in a neural network.

3. The processing device according to claim 1, wherein
the inspection image input to the first input unit and the reference image input to the second input unit are images having an N dimension and M channels (N, M are integers).

4. The processing device according to claim 1, wherein
the processing unit (1) combines the inspection image and the reference image and then (2) subjects the combination to at least one of a process in a convolutional layer and a process in a pooling layer.

5. The processing device according to claim 1, wherein
the processing unit (1) subjects the inspection image to at least one of a process in a convolutional layer and a process in a pooling layer and subjects the reference image to at least one of a process in a convolutional layer and a process in a pooling layer, (2) combines a result of processing the inspection image and a result of processing the reference image, and (3) subjects flail the combination to at least one of a process in a convolutional layer and a process in a pooling layer.

6. The processing device according to claim 1, wherein
the processing unit (1) subjects the inspection image to at least one of a process in a convolutional layer and a process in a pooling layer and subjects the reference image to at least one of a process in a convolutional layer and a process in a pooling layer, and (2) combines a result of processing the inspection image and a result of processing the reference image.

7. The processing device according to claim 5, wherein
a weight coefficient used by the processing unit to subject the inspection image to the process in the convolutional layer is commonly used by the processing unit as a weight coefficient to subject the reference image to the process in the convolutional layer.

8. The processing device according to claim 1, wherein
the processing unit (1) combines the inspection image and the reference image and (2) subjects fall the combination to a process in a fully connected layer.

9. The processing device according to claim 1, wherein
the processing unit (1) subjects the inspection image to a process in a fully connected layer and subjects the reference image to a process in a fully connected layer, (2) combines a result of processing the inspection image and a result of processing the reference image, and (3) subjects flail the combination to a process in a fully connected layer.

10. The processing device according to claim 1, wherein
the processing unit (1) subjects the inspection image to a process in a fully connected layer and subjects the reference image to a process in a fully connected layer and (2) combines a result of processing the inspection image and a result of processing the reference image.

11. The processing device according to claim 4, wherein
the processing unit merges two inputs into one to produce the combination.

12. The processing device according to claim 11, wherein
the processing unit performs flail the merge by arranging the two inputs in one direction.

13. The processing device according to claim 4, wherein
the processing unit derives a difference between two inputs to produce the combination.

14. The processing device according to claim 13, wherein
the processing unit merges the difference with at least one of the two inputs to produce the combination.

15. A processing method comprising:
receiving an inspection image subject to inspection;
receiving a normal reference image that should be referred to;
subjecting the inspection image input and the reference image input to a process in a neural network, wherein the neural network used in the processing is a convolutional neural network in which a fully connected layer is excluded, and a filter of the convolutional layer in the convolutional neural network is trained to learn a processing result having a 1×1 spatial dimension; and
outputting information that results from the process and relating to an item of defect included in the inspection image.

* * * * *